(12) United States Patent
Happy

(10) Patent No.: US 10,240,747 B2
(45) Date of Patent: Mar. 26, 2019

(54) VEHICLE LIGHTING STRUCTURE WITH FIRST LAMP ASSEMBLY FIXED TO VEHICLE BODY AND SECOND LAMP ASSEMBLY FIXED TO TRUNK LID THAT ALIGN WITH ONE ANOTHER WITH TRUNK LID CLOSED

(71) Applicant: Nissan North America, Inc., Franklin, TN (US)

(72) Inventor: Kyle Happy, Walled Lake, MI (US)

(73) Assignee: Nissan North America, Inc., Franklin, TN (US)

( * ) Notice: Subject to any disclaimer, the term of this patent is extended or adjusted under 35 U.S.C. 154(b) by 456 days.

(21) Appl. No.: 15/074,401

(22) Filed: Mar. 18, 2016

(65) Prior Publication Data

US 2017/0268741 A1   Sep. 21, 2017

(51) Int. Cl.
| | |
|---|---|
| *F21V 8/00* | (2006.01) |
| *B60Q 1/26* | (2006.01) |
| *F21S 43/27* | (2018.01) |
| *F21S 43/14* | (2018.01) |
| *F21S 43/19* | (2018.01) |
| *F21S 43/237* | (2018.01) |
| *F21S 43/245* | (2018.01) |

(Continued)

(52) U.S. Cl.
CPC ............ *F21S 43/27* (2018.01); *B60Q 1/2607* (2013.01); *F21S 43/14* (2018.01); *F21S 43/19* (2018.01); *F21S 43/195* (2018.01); *F21S 43/237* (2018.01); *F21S 43/245* (2018.01);

*F21S 43/249* (2018.01); *B60Q 1/0011* (2013.01); *B60Q 1/0041* (2013.01)

(58) Field of Classification Search
CPC .. B60Q 1/0011; B60Q 1/0041; B60Q 1/2607; F21S 43/27; F21S 43/237; F21S 43/245; F21S 43/249; F21S 43/14; F21S 43/19; F21S 43/195

See application file for complete search history.

(56) References Cited

U.S. PATENT DOCUMENTS

| | | | |
|---|---|---|---|
| 5,495,400 A * | 2/1996 | Currie ................. | B60Q 1/0011 340/468 |
| 6,070,985 A * | 6/2000 | Riser .................... | B60Q 1/0011 313/637 |
| 9,310,044 B2 * | 4/2016 | Pusch ................. | B60Q 1/2607 |

(Continued)

*Primary Examiner* — Alan B Cariaso
(74) *Attorney, Agent, or Firm* — Global IP Counselors, LLP

(57) ABSTRACT

A first lamp assembly has a first side surface with a first light passage and a hollow interior with a first light dispersing member disposed therein. The first light dispersing member is positioned to receive light emitted through the first light passage and emit light received via the first light passage. The second lamp assembly has a hollow interior with a first lighting device disposed therein, and a second side surface with a second light passage. The first lighting device is positioned to emit light through the second light passage, such that when the second light passage and the first light passage are adjacent to one another with the first and second light passages being aligned, and with the first lighting device operating, the first lighting device emits light through the second light passage into the second light passage illuminating the first light dispersing member within the first lamp assembly.

10 Claims, 8 Drawing Sheets

(51) Int. Cl.
*F21S 43/249* (2018.01)
*B60Q 1/00* (2006.01)

(56) References Cited

U.S. PATENT DOCUMENTS

| | | | | |
|---|---|---|---|---|
| 9,452,707 | B1* | 9/2016 | Tsai | B60Q 1/30 |
| 9,849,824 | B2* | 12/2017 | Anderson | B60Q 1/0041 |
| 2006/0285348 | A1* | 12/2006 | Valcamp | B60Q 1/2607 |
| | | | | 362/545 |
| 2015/0323149 | A1* | 11/2015 | Salter | F21S 43/13 |
| | | | | 362/510 |
| 2016/0332563 | A1* | 11/2016 | Tseng | B60Q 1/0041 |

* cited by examiner

VEHICLE LIGHTING STRUCTURE WITH FIRST LAMP ASSEMBLY FIXED TO VEHICLE BODY AND SECOND LAMP ASSEMBLY FIXED TO TRUNK LID THAT ALIGN WITH ONE ANOTHER WITH TRUNK LID CLOSED

BACKGROUND

Field of the Invention

The present invention generally relates to a vehicle lighting structure. More specifically, the present invention relates to a vehicle lighting structure having a first lamp assembly and a second lamp assembly movable relative to one another, the second lamp assembly having an active lighting element that emits light to the first lamp assembly illuminating a passive light element within the first lamp assembly.

Background Information

Most vehicles typically include various lamp assemblies for illuminating exterior areas about the vehicle. For example, most vehicles have a pair of vehicle headlamp assemblies in the front of the vehicle and a pair of vehicle tail light assemblies in the rear of the vehicle. Vehicle lamp assemblies typically function as parking lamps, daytime running lamps, fog lights, off-road utility lights as well as various other signaling devices. In addition to providing light, tail light assemblies can also be decorative with respect to the vehicle. Many modern automotive vehicle lamp assemblies have begun using light emitting diodes (LEDs) as a form of lighting device. Automakers often combine two separate lighting devices for lamp units, such as using a light pipe and a reflector structure to provide an aesthetically pleasing illuminated appearance along the edges of a lamp assembly. In the case of vehicle tail light assemblies, it has also been increasingly popular to mount the vehicle tail light assemblies onto a movable panel of a vehicle, such as a trunk lid or a rear door.

SUMMARY

One object of the present disclosure is to provide a first lamp assembly with a light dispersing member and a second lamp assembly separated from the first lamp assembly, the second lamp assembly being provided with a lighting device that emits light aimed at the light dispersing member such that when the lighting device within the second lamp assembly is operating the light dispersing member within the first lamp assembly emits the light received from the lighting device.

In view of the state of the known technology, one aspect of the present disclosure is to provide a vehicle lighting structure with a first lamp assembly and a second lamp assembly. The first lamp assembly has a first attachment surface, a first transparent surface opposite the first attachment surface, and a first side surface extending from the first transparent surface to the first attachment surface. The first side surface has a first light passage. The first lamp assembly also has a hollow interior that includes a first light dispersing member disposed within the hollow interior. The first light dispersing member is positioned to receive light emitted through the first light passage and emit light received via the first light passage to the first transparent surface. The second lamp assembly has a second attachment surface, a second transparent surface opposite the second attachment surface and a second side surface extending from the second transparent surface to the second attachment surface. The second side surface has a second light passage. The second lamp assembly also has a hollow interior with a first lighting device disposed therein. The first lighting device is positioned to emit light through the second light passage, such that when the second light passage and the first light passage are adjacent to one another with the first and second light passages being aligned, and with the first lighting device operating, the first lighting device emits light through the second light passage into the first light passage illuminating the first light dispersing member within the first lamp assembly.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
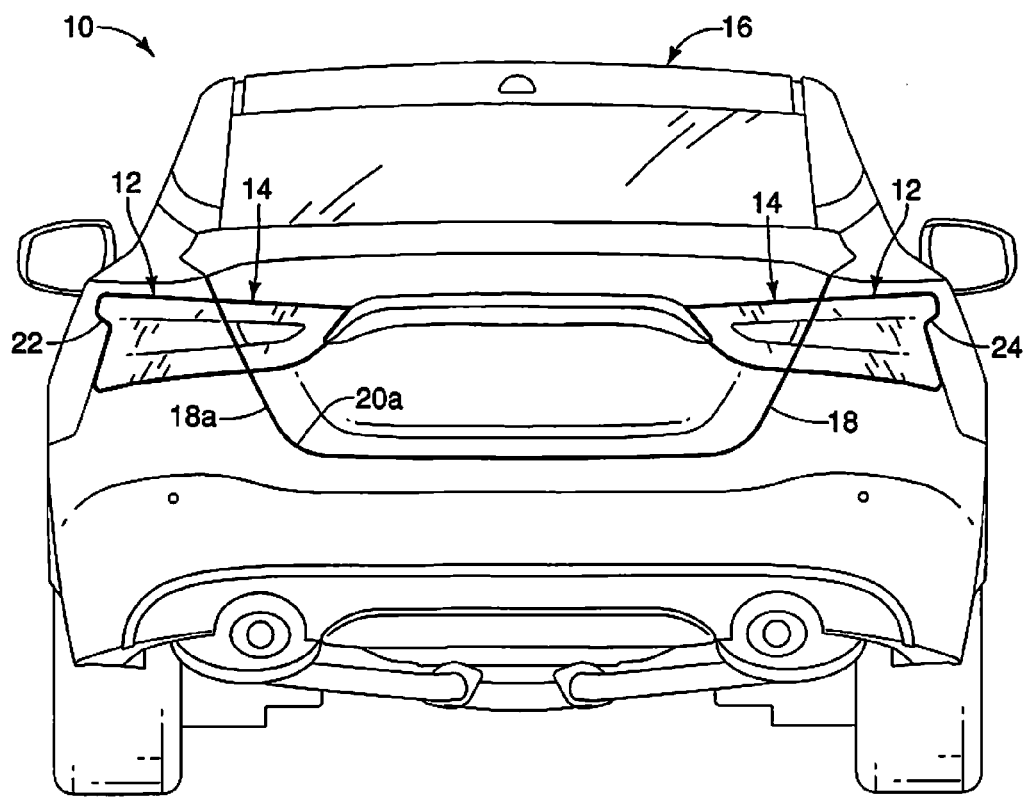
FIG. 1 is a rear view of a vehicle body structure showing an opening and a closure member covering the opening, with a first lamp assembly attached to the vehicle body structure adjacent to the opening and a second lamp assembly attached to the closure member, with the first and second lamp assemblies being aligned with the closure member being in a closed position in accordance with the first embodiment.
Figure 2:
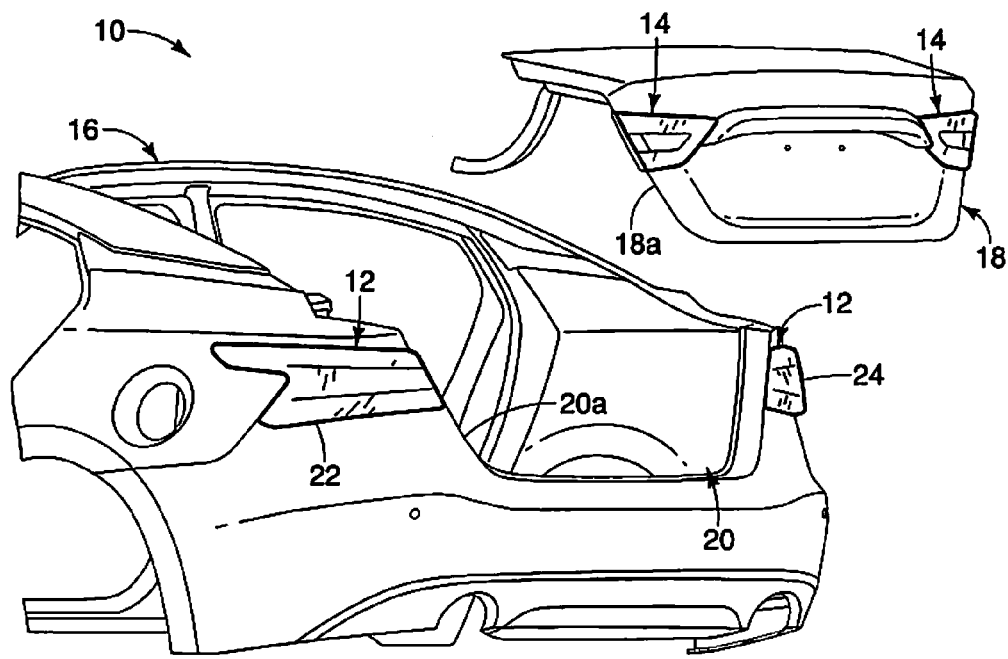
FIG. 2 is an exploded perspective view of the vehicle body structure depicted in FIG. 1, showing the opening, the closure member, the first lamp assembly and the second lamp assembly in accordance with the first embodiment.
Figure 3:
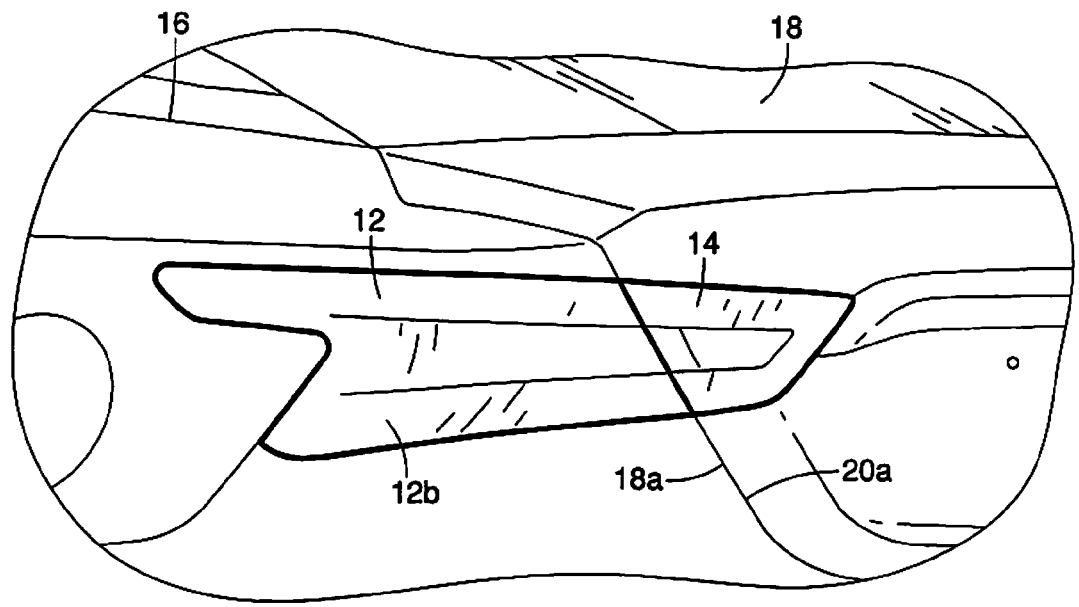
FIG. 3 is a perspective view of a rear portion of the vehicle body structure showing the first lamp assembly and the second lamp assembly aligned with one another with the closure member in the closed position in accordance with the first embodiment.

Referring initially to FIGS. 1 and 2, a vehicle 10 is illustrated that has a vehicle lighting structure that includes a first lamp assembly 12 and a second lamp assembly 14. In the depicted embodiments, when the first and second lamp assemblies 12 and 14 are adjacent to one another, combined they have the appearance of being a single structure, as shown in FIG. 3. However, as is described in greater detail below, the first lamp assembly 12 and the second lamp assembly 14 are separate structures that are movable relative to one another.

In the depicted embodiment, the first lamp assembly 12 and the second lamp assembly 14 are shown with specific contours and shapes. However, it should be understood from the drawings and the description herein that the depicted overall design and shapes of the first lamp assembly 12 and the second lamp assembly 14 are merely one example of such structures and that the disclosure is not limited to the depicted design. In other words, the first lamp assembly 12 and the second lamp assembly 14 can have differing shapes and contours and still fall within the scope of the accompanying claims.

The vehicle 10 has a vehicle body structure 16 that includes two pairs of the first lamp assembly 12 and the second lamp assembly 14, one pair being installed at a left rear corner 22 of the vehicle body structure 16 and the other provided at a right rear corner 24 of the vehicle body structure 16. The two pairs of the first lamp assembly 12 and the second lamp assembly 14 are functionally and structurally identical except that they are mirror images of one another (symmetrical about a longitudinal center line of the vehicle 10). Since the two pairs of the first lamp assembly 12 and the second lamp assembly 14 are basically the same, description of only one pair of the first lamp assembly 12 and the second lamp assembly 14 is provided below for the sake of brevity, but applies equally to both pairs.

The vehicle body structure 16 is a conventional structure that is configured to accommodate the first and second lamp assemblies 12 and 14. While the vehicle 10 is illustrated as a sedan, it will be apparent to those skilled in the art from this disclosure that the first and second lamp assemblies 12 and 14 can be configured to be used with other vehicle body styles. In the illustrated embodiment of the vehicle 10, the vehicle body structure 16 is made of one or more body panels to form a unibody construction. Alternatively, the vehicle body structure 16 can be a body that is mounted on a frame.

As shown in FIG. 2, the vehicle body structure 16 has at least one stationary body panel that at least partially defines an access opening 20, which is an opening that accesses a trunk of the vehicle 10. A movable body panel 18 (a closure member) is movably mounted on the vehicle body structure 16 between a closed position (FIG. 1) and an open position.

The movable body panel 18 is a trunk lid that is hinged to the vehicle body structure 16 to selectively close and open the access opening 20 in a conventional manner. In the illustrated embodiment, the movable body panel 18 has a peripheral edge 18a that aligns with a peripheral edge 20a of the access opening 20 for the vehicle 10. One of the first and second lamp assemblies 12 and 14 is mounted on the vehicle body structure 16 and the other of the first lamp assembly 12 and the second lamp assembly 14 is mounted on the movable body panel 18. In the depicted embodiment, the first lamp assembly 12 is mounted to a stationary fender section of the vehicle body structure 16 with one edge thereof being adjacent to a peripheral edge 20a of the access opening, and the second tail lamp assembly 14 is mounted on the movable body panel 18 with one edge being adjacent to the peripheral edge 18a of the movable body panel 18. As is described in greater detail below, when the movable body panel 18 is in the closed position (FIGS. 1 and 3), the first and second lamp assemblies 12 and 14 are aligned with one another in a manner described in greater detail below. However, it should be understood from the drawings and the description herein that alternatively the first lamp assembly 12 can be mounted to the movable body panel 18 and the second lamp assembly 14 can be mounted to the stationary fender section of the vehicle body structure 16.

As is described further below, when aligned and operating, the second lamp assembly 14 includes an illumination device (lighting device $L_4$) that emits light to the first lamp assembly 12, which includes a passive light element (first light dispersing member 30), such that light emitted from the second lamp assembly 14 is received by the first lamp assembly 12 causing the first lamp assembly 12 to be illuminated and emit light.

Figure 5:
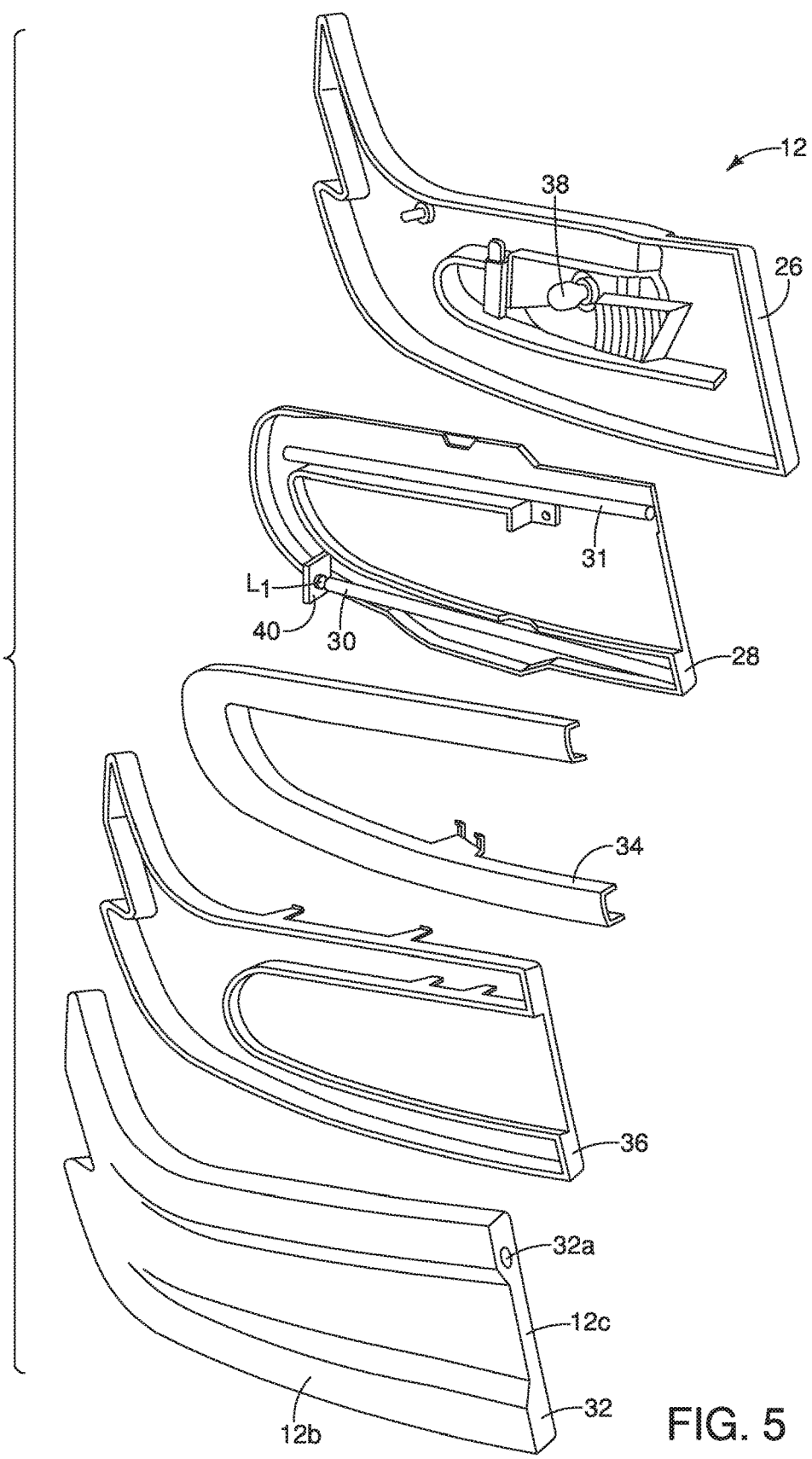
FIG. 5 is an exploded perspective view of the first light assembly removed from the vehicle body structure showing various elements of the first lamp assembly, including a first light dispersing member aligned with the light passage in accordance with the first embodiment.

Referring now to FIG. 5, the first lamp assembly 12 basically includes a lamp housing 26, a bezel member 28, a first light dispersing member 30, a second light dispersing member 31, a transparent outer lens cover 32, a transparent inner lens cover 34 and an inner frame member 36. The overall shapes and configurations of the transparent outer lens cover 32, the transparent inner lens cover 34 and the inner frame member 36 depend on the design of the lamp housing 26, the bezel member 28 and the light dispersing member 30. In other words, the transparent outer lens cover 32, the transparent inner lens cover 34 and the inner frame member 36 are configured to complement the shapes and overall designs of the lamp housing 26, the bezel member 28 and the light dispersing member 30.

Figure 4:
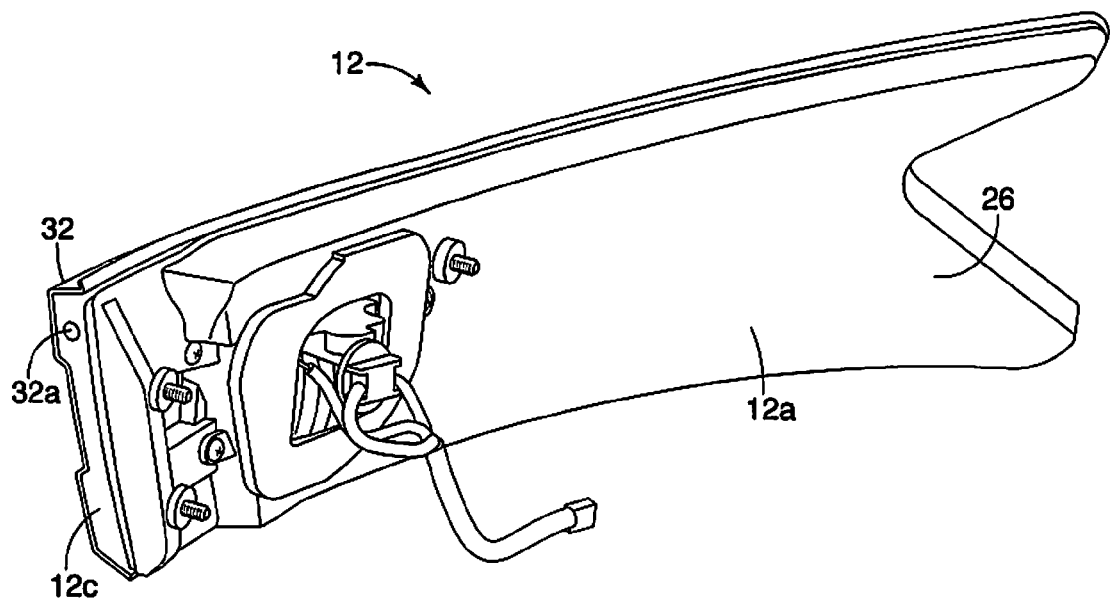
FIG. 4 is a perspective view of the first lamp assembly removed from the vehicle body structure showing an attachment surface and a side surface that includes a light passage in accordance with the first embodiment.

The first lamp assembly 12 includes an attachment surface 12a defined along the lamp housing 26, as shown in FIG. 4, a transparent surface 12b defined along the transparent outer lens cover 32 as shown in FIGS. 3 and 5, and a side surface 12c as shown in FIGS. 4 and 5. The attachment surface 12a includes attachment structures (such as mechanical fastening elements) that facilitate attachment to the vehicle body structure 16 in a conventional manner.

The bezel member 28, the light dispersing member 30, the transparent inner lens cover 34 and the inner frame member 36 are all disposed inside an internal lamp space that is defined by the transparent outer lens cover 32 and is fastened to the lamp housing 26. Specifically, the bezel member 28 and the inner frame member 36 are fixedly mounted to the lamp housing 26 by a plurality of fasteners. The first light dispersing member 30 and the second light dispersing member 31 are supported on the bezel member 28 by snap-fitting clips (not shown) in a conventional manner.

The transparent inner lens cover 34 is mounted to the bezel member 28 to overlie the light emitting portions of the first light dispersing member 30 and the second light dispersing member 31. The transparent inner lens cover 34 diffuses the light that is emitted from the light emitting portions of the first and second light dispersing members 30 and 31. The inner frame member 36 is also preferably attached to the bezel member 28 by a snap-fit arrangement. The inner frame member 36 aids in fastening and positioning the transparent inner lens cover 34 with respect to the bezel member 28. A further detailed description of an example of the design and function of each of the lamp housing 26, the bezel member 28, the transparent outer lens cover 32, the transparent inner lens cover 34 and the inner frame member 36 can be found in co-pending and commonly assigned U.S. patent application Ser. No. 14/612,565, filed Feb. 3, 2015 (assigned to Nissan North America, Inc.). U.S. patent application Ser. No. 14/612,565 is incorporated herein by reference in its entirety.

As seen in FIG. 5, the first lamp assembly 12 further includes a turn signal light 38 that is mounted to the lamp housing 26. The turn signal light 38 emits light that shines through a portion of the transparent outer lens cover 32. In other words, the turn signal light 38 is positioned to illuminate a central portion of the transparent outer lens cover 32 inside the transparent inner lens cover 34. Thus, the light emitted from the turn signal light 38 does not pass through the first light dispersing member 30, the second light dispersing member 31 and the transparent inner lens cover 34.

As shown in FIG. 5, the first lamp assembly 12 further includes a circuit board 40 that controls the operation and functions of a lighting device $L_1$ that illuminates the first light dispersing member 30 in a conventional manner. Specifically, when a vehicle operator turns either parking or headlights on, the circuit board 40 is provided with power and illuminates the lighting device $L_1$ in a conventional manner. The lighting device $L_1$ on the circuit board 40 is, for example, an LED that emits light to an adjacent end of the first light dispersing member 30. In the depicted embodiment, the first light dispersing member 30 is an optical element that illuminates when provided with light from the lighting device $L_1$.

In the depicted embodiment, the first light dispersing member 30 and the second light dispersing member 31 are formed from a material that can transmit and diffuse light in preselected amounts across the length of the first and second light dispersing members 30 and 31. The first light dispersing member 30 and the second light dispersing member 31 are known in the art as light pipes that emit light along their length when illuminated from one end thereof. Since light pipes are conventional lighting members, further description is omitted for the sake of brevity. However, it should be understood from the drawings and the description herein that the first and second light dispersing members 30 and 31 can alternatively be reflective elements, such as parabolic mirrors, or other similar constructs that receive light from a remote light source and reflect, radiate, disperse or otherwise emit that light outward and away from itself.

In the depicted embodiment, the first light dispersing member 30 is illuminated by the lighting device $L_1$ of the circuit board 40. Specifically, the first light dispersing member 30 is actively illuminated by a light source located within the first lamp assembly 12. As is described in greater detail below, the second light dispersing member 31 is illuminated by a light source that is not located within the first lamp assembly 12, but instead is located within the second lamp assembly 14. In other words, the first lamp assembly 12 includes the circuit board 40 that illuminates the first light dispersing member 30, and does not include any device or circuitry that would otherwise illuminate the second light dispersing member 31. Hence, the first light dispersing member 30 is actively illuminated from within the first lamp assembly 12, while the second light dispersing member 31 is a passive lighting member within the first lamp assembly 12.

In order for light to be directed to the second light dispersing member 31 from outside the first lamp assembly 12, the side surface 12*c* of the first lamp assembly 12 is provided with a light passage 32*a*. More specifically, the transparent outer lens cover 32 is provide with the light passage 32*a*. The light passage 32*a* can take any of a variety of forms. For example, the light passage 32*a* can be a transparent portion of the transparent outer lens cover 32 at an upper area of the side surface 12*c* of the first lamp assembly 12. In the first embodiment, the light passage 32*a* is, or, can be a lens (referred to as a lens 32*a*) molded into or inserted into an aperture formed in the transparent lens cover 32. The location of the light passage 32*a* (the lens 32*a*) is predetermined such that the light passage 32*a* aligns with an adjacent end of the second light dispersing member 31 with the first lamp assembly 12 being fully assembled.

A description of the second lamp assembly 14 is now provided with specific reference to FIGS. 6-10. The second lamp assembly 14 basically includes a lamp housing 126, a bezel member 128, a light dispersing member 130, a transparent outer lens cover 132, a transparent inner lens cover 134 and an inner frame member 136. The overall shapes and configurations of the transparent outer lens cover 132, the transparent inner lens cover 134 and the inner frame member 136 depend on the design of the lamp housing 126, the bezel member 128 and the light dispersing member 130. In other words, the transparent outer lens cover 132, the transparent inner lens cover 134 and the inner frame member 136 are configured to complement the shapes and overall designs of the lamp housing 126, the bezel member 128 and the light dispersing member 130.

Figure 6:
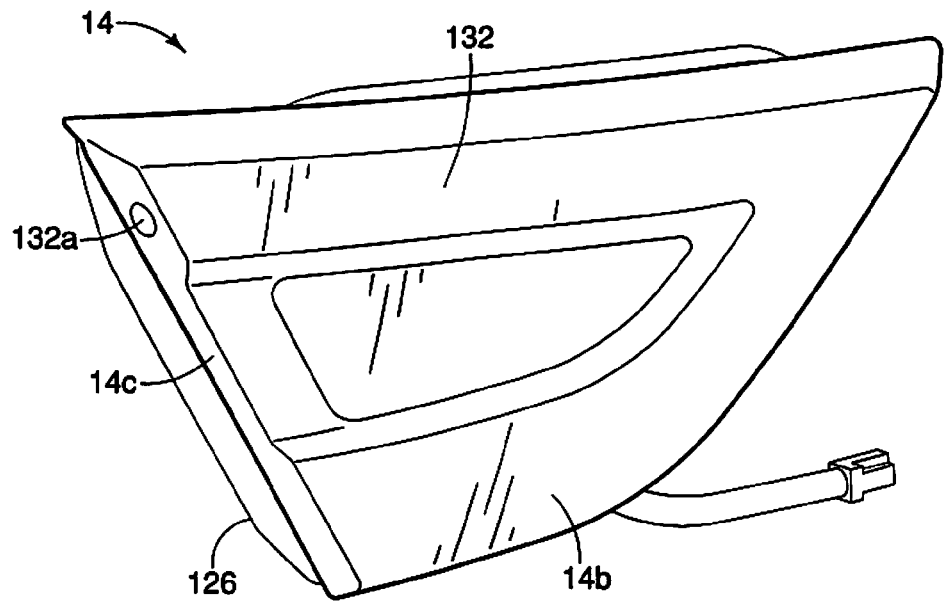
FIG. 6 is a perspective view of the second lamp assembly removed from the vehicle body structure showing a transparent surface and a side surface that includes a light passage in accordance with the first embodiment.
Figure 7:
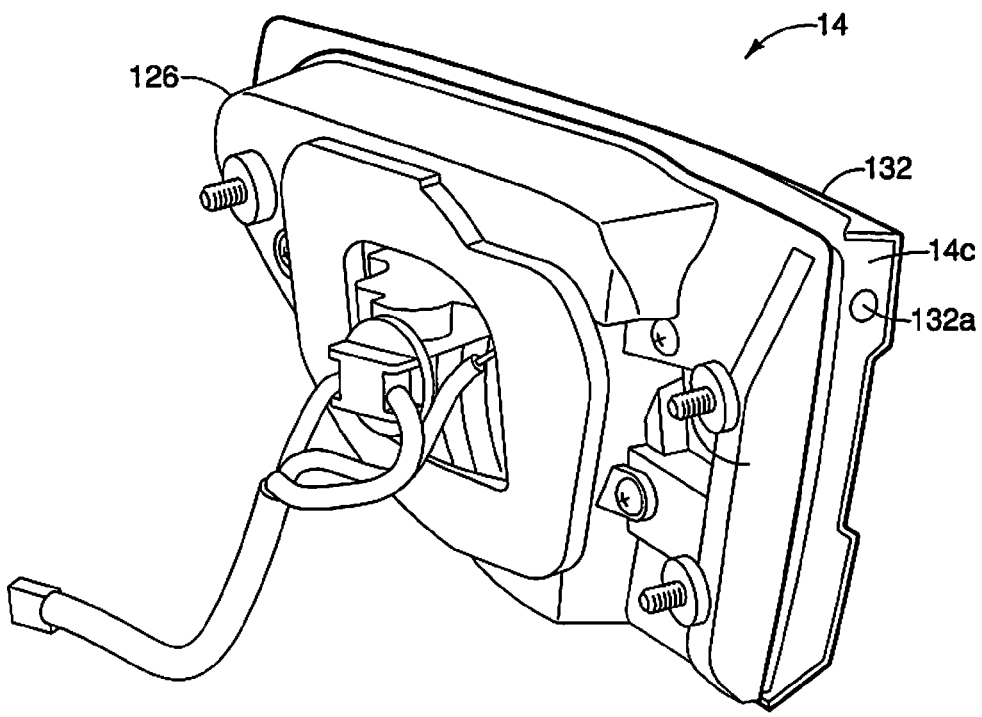
FIG. 7 is another perspective view of the second lamp assembly showing an attachment surface and the light passage in accordance with the first embodiment.
Figure 8:
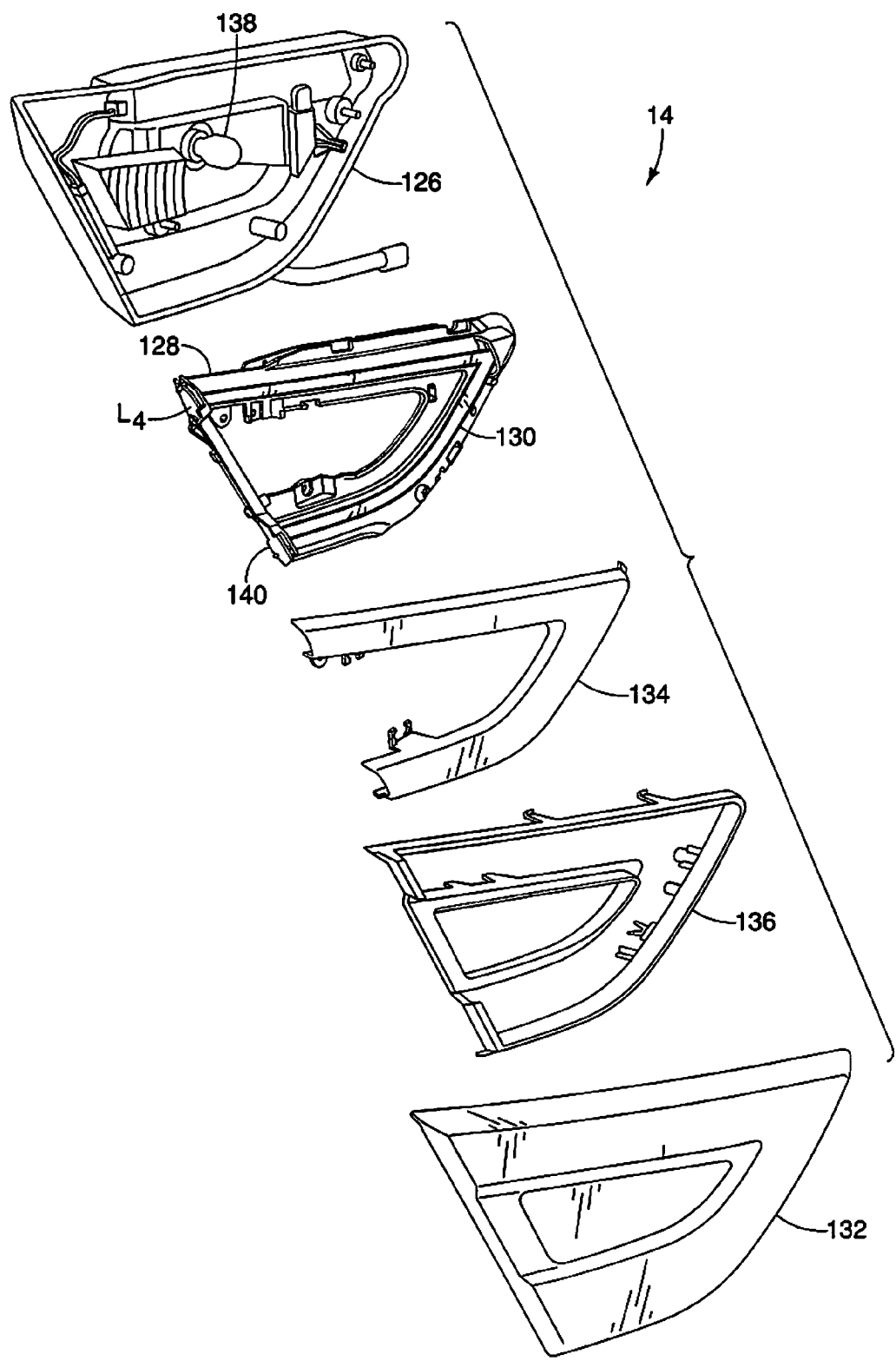
FIG. 8 is an exploded perspective view of the second lamp assembly showing various elements of the second lamp assembly, including a lighting device aligned with the light passage of the second lamp assembly in accordance with the first embodiment.

The second lamp assembly 14 includes an attachment surface 14*a* defined along the lamp housing 126, as shown in FIG. 7, a transparent surface 14*b* defined along the transparent outer lens cover 132 as shown in FIGS. 6 and 8, and a side surface 14*c* as shown in FIGS. 7 and 8. The attachment surface 14*a* includes attachment structures (such as mechanical fastening elements) that facilitate attachment to the movable body panel 18 (the trunk lid) in a conventional manner, such that the second lamp assembly 14 moves with the movable body panel 18 between the closed position and an open position.

The bezel member 128, the light dispersing member 130, the transparent inner lens cover 134 and the inner frame member 136 are all disposed inside an internal lamp space that is defined by the transparent outer lens cover 132 and is fastened to the lamp housing 126. Specifically, the bezel member 128 and the inner frame member 136 are fixedly mounted to the lamp housing 126 by a plurality of fasteners. The light dispersing member 130 is supported on the bezel member 128 by snap-fitting clips (not shown) in a conventional manner.

The transparent inner lens cover 134 is mounted to the bezel member 128 to overlie the light emitting portions of the light dispersing member 130. The transparent inner lens cover 134 diffuses the light that is emitted from the light emitting portions of the light dispersing members 130. The inner frame member 136 is also preferably attached to the bezel member 128 by a snap-fit arrangement. The inner frame member 136 aids in fastening and positioning the transparent inner lens cover 134 with respect to the bezel member 128. A further detailed description of an example of the design and function of each of the lamp housing 126, the bezel member 128, the transparent outer lens cover 132, the transparent inner lens cover 134 and the inner frame member 136 can be found in co-pending and commonly assigned U.S. patent application Ser. No. 14/612,565, filed Feb. 3, 2015 (assigned to Nissan North America, Inc.). U.S. patent application Ser. No. 14/612,565 is incorporated herein by reference in its entirety.

As seen in FIG. 8, the second lamp assembly 14 further includes a backup light 138 that is mounted to the lamp housing 126. The backup light 138 emits light that shines through a portion of the transparent outer lens cover 132. In other words, the backup light 138 is positioned to illuminate a central portion of the transparent outer lens cover 132 inside the transparent inner lens cover 134. Thus, the light emitted from the backup light 138 does not pass through the light dispersing member 130 and the transparent inner lens cover 134.

Figure 9:
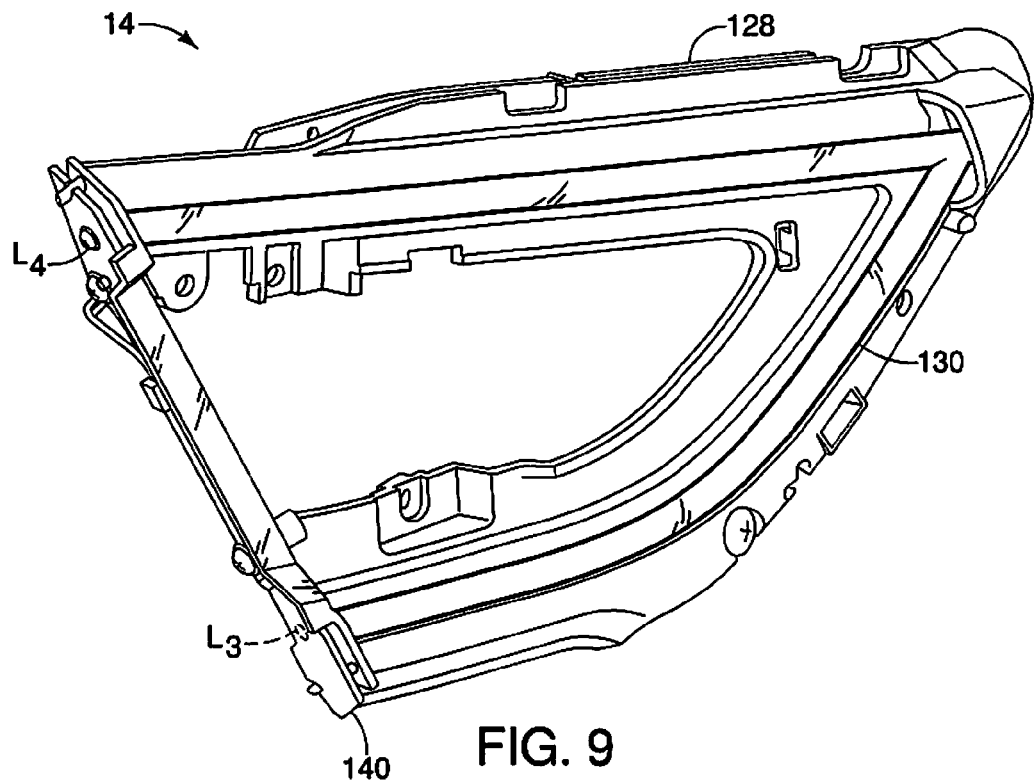
FIG. 9 is a perspective view of the lamp housing of the second lamp assembly shown removed from the second lamp assembly, showing the lighting device in accordance with the first embodiment.
Figure 10:
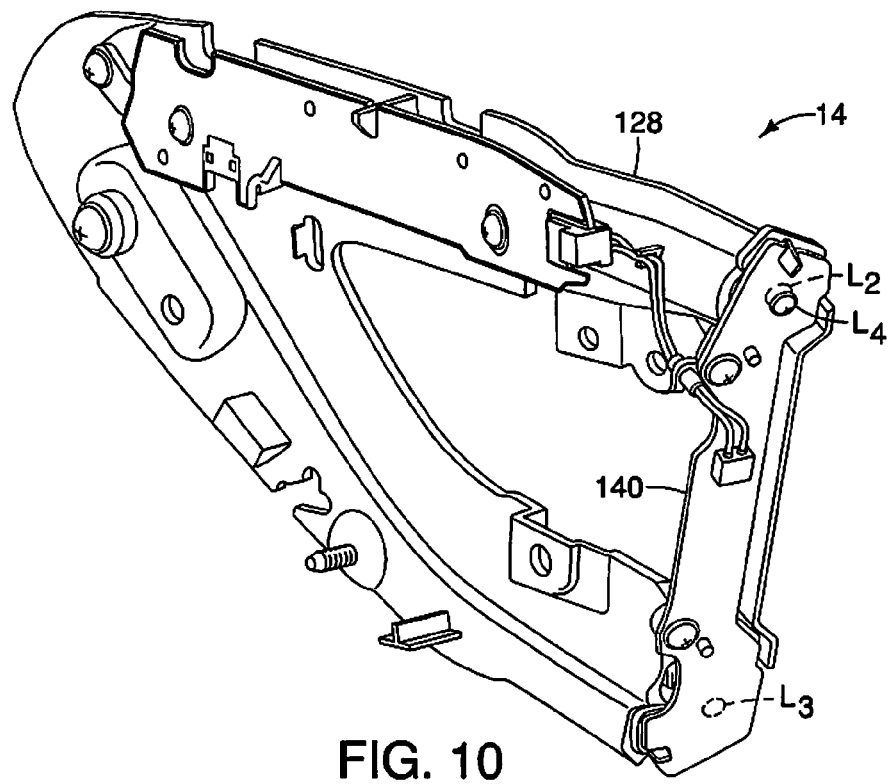
FIG. 10 is another perspective view of the lamp housing of the second lamp assembly shown removed from the second lamp assembly, showing the lighting device in accordance with the first embodiment.

As shown in FIGS. 8-10, the second lamp assembly 14 further includes a circuit board 140 that controls the operation and functions of a lighting device $L_2$ (FIGS. 11 and 12) that illuminates the light dispersing member 130 in a conventional manner. Specifically, when a vehicle operator turns either parking or headlights on in a conventional manner, the circuit board 140 is provided with power and illuminates the lighting device. The lighting device $L_2$ on the circuit board 140 is, for example, an LED that emits light to an adjacent end of the light dispersing member 130. In the depicted embodiment, the light dispersing member 130 is an optical element that illuminates when provided with light from the lighting device $L_2$.

Like the first light dispersing member 30 described above, the light dispersing member 130 is formed from a material that can transmit and diffuse light in preselected amounts across the length of the light dispersing member 130. The light dispersing member 130 is basically another light pipe that emit light along its length when illuminated from one end thereof.

In the depicted embodiment, the light dispersing member 130 has a crescent shape as shown in FIG. 8. The light dispersing member 130 can be illuminated solely by the lighting device $L_2$ of the circuit board 140, but can additionally be illuminated by another lighting device $L_3$, as shown in FIGS. 10 and 12.

The circuit board 140 additionally includes a lighting device $L_4$ located on a side of the circuit panel 140 opposite the lighting device $L_2$. The lighting device $L_2$ is positioned to emit light to the second light dispersing member 31 of the first light assembly 14 thereby illuminating the second light dispersing member 31 of the first light assembly 14.

In order for light emitted from the lighting device $L_4$ to be received by the second light dispersing member 31 of the first light assembly 14, the side surface 14c of the second lamp assembly 14 is provided with a light passage 132a. The light passage 132a can take any of a variety of forms. For example, the light passage 132a can be a transparent portion of the transparent outer lens cover 132 at an upper area of the side surface 12c of the second lamp assembly 14, or, can be a lens (lens 132a) molded into or inserted into an aperture formed in the transparent lens cover 32. The location of the light passage 32a is predetermined such that the light passages 32a and 132a align when the movable body panel 18 is in the closed position with the side surface 12a and the side surface 14a are side by side, as shown in FIGS. 11 and 12.

Figure 11:
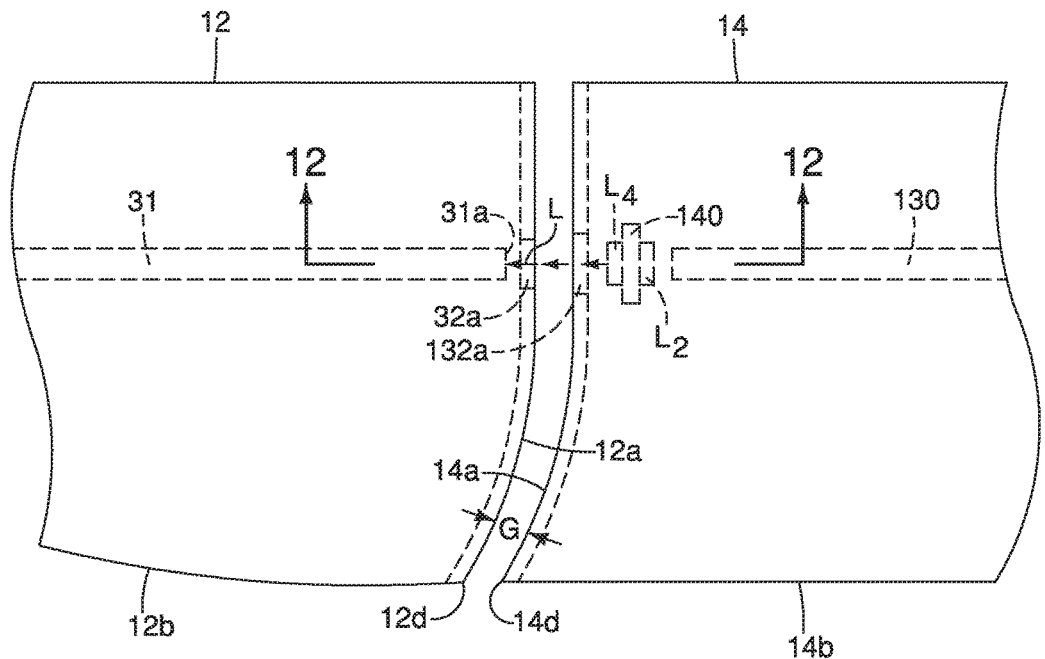
FIG. 11 is a top schematic view of the vehicle lighting structure, showing the first lamp assembly and the second lamp assembly with the closure member in the closed position with the light passage of the first lamp assembly aligned with the light passage of the second lamp assembly such that the lighting device of the second lamp assembly can emit light through the light passage of the second lamp assembly and through the light passage of the first lamp assembly in order illuminate the first light dispersing member within the first lamp assembly in accordance with the first embodiment.
Figure 12:
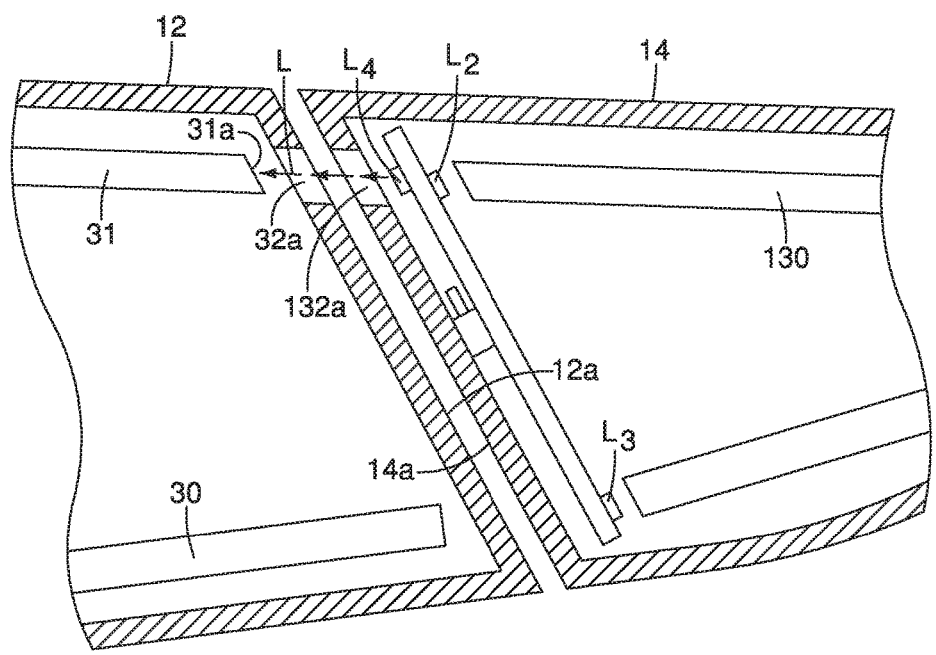
FIG. 12 is a cross-section schematic view of the vehicle lighting structure taken along the line 12-12 in FIG. 11, showing the light passage of the first lamp assembly aligned with the light passage of the second lamp assembly such that the lighting device of the second lamp assembly can emit light through the light passage of the second lamp assembly and through the light passage of the first lamp assembly in order illuminate the first light dispersing member within the first lamp assembly in accordance with the first embodiment.

FIGS. 11 and 12 shown that with the movable body panel 18 in the closed position, the lighting device $L_4$, the light passage 132a, the light passage 32a and an end 31a of the second light dispersing member 31 align. In this condition, when the lighting device $L_4$ is operated and is emitting light L, the light L passes through the light passage 132a and through the light passage 32a. The end 31a of the second light dispersing member 31 receives the light L and is illuminated by receipt of the light L.

It should be understood from the drawings and the description herein, that it is not necessary for the lighting device $L_4$, the light passage 132a, the light passage 32a and an end 31a of the second light dispersing member 31 to be perfectly aligned with one another in order for the second light dispersing member 31 to be illuminated by the light L from the lighting device $L_4$. Rather, as long as at least a portion of the light L emitted the lighting device $L_4$ is directly aimed at the end 31a of the second light dispersing member 31, the second light dispersing member 31 can be illuminated. For example, the lighting device $L_4$ is an LED that emits strong and intense rays of light. The lighting device $L_4$, the light passage 132a and the light passage 32a can be configured either by dimensioning, location and/or via conventional optical arrangements, to narrow the light L from the lighting device $L_4$ to a circular beam that is aimed at the end 31a of the second light dispersing member 31. Even if such a circular beam of the light L overlaps with only 50% of the surface area of the end 31a of the second light dispersing member 31, the second light dispersing member 31 will be illuminated by the light L.

When the lighting device $L_4$ is operating and aiming emitting light L to the end 31a of the second light dispersing member 31, there is a possibility of light leakage into a gap G defined between the first lamp assembly 12 and the second lamp assembly 14 (see FIG. 11). At night such leakage of light is undesirable. To avoid such leakage, a rear corner 12d of the first lamp assembly 12 along an edge of the transparent surface 12b can be provided with a curved contour, as shown in FIG. 11. A rear corner 14d of the second lamp assembly 14 along an edge of the transparent surface 14b can be provided with a complementary curved projection, as is also shown in FIG. 11. The projection of the rear corner 14d defines a shield that blocks light L from the lighting device $L_4$ from being emitted directly rearward from the vehicle body structure 16.

Figure 13:
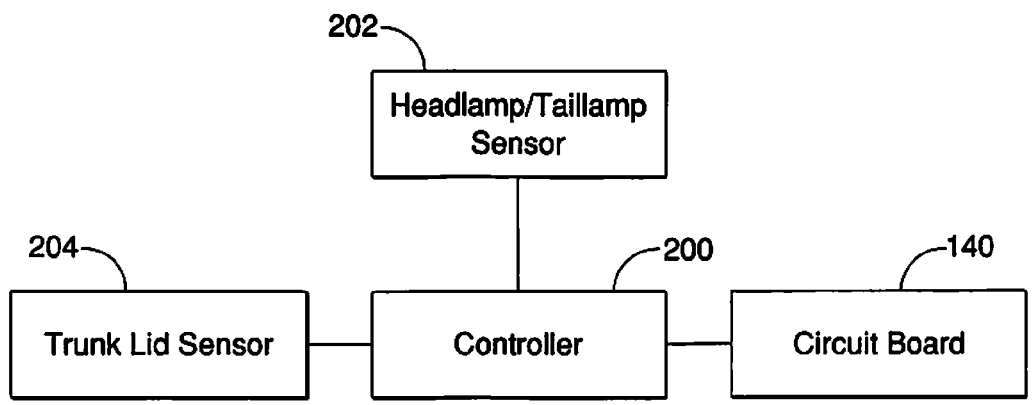
FIG. 13 is a block diagram of a control system operable to operate the lighting device of the second lamp assembly in response to movement of the closure member in accordance with the first embodiment.

When the movable body panel 18 is moved from the closed position to an open position, the lighting device $L_4$ and the end 31a of the second light dispersing member 31 will no longer be in alignment, and the second light dispersing member 31 will cease to be illuminated by the lighting device $L_4$. As shown in FIG. 13, the vehicle body structure 16 is provided with a controller 200 that is connected to the circuit board 140, a Headlamp/Tail Lamp sensor 202 and a trunk lid sensor 204. The circuit board 140 includes the lighting device $L_4$ and turns the lighting device $L_4$ on and off in response to operation of a light switch (not shown) on the instrument panel (not shown) of the vehicle 10, operated by a vehicle operator. The Headlamp/Tail Lamp sensor 202 is connected to lighting circuits (not shown) within the vehicle 10 that includes the light switch operated by the vehicle operator. The Headlamp/Tail Lamp sensor 202 provides signals to the controller 200 indicating the current operational status of the vehicle lights.

The trunk lid sensor 204 is installed within the vehicle body structure 16 so as to provide signals that indicate the positional status of the movable closure member 18.

When the vehicle operator turns the headlamps or parking lamps on, the circuit board 140 turns the lighting device $L_4$ on thereby providing light to the second light dispersing member 31. The Headlamp/Tail Lamp sensor 202 provides signals to the controller 200 indicating this status.

The controller 200 is configured to permit operation of the lighting device $L_4$ only when the movable body panel 18 is the closed position shown in FIG. 1 and when the vehicle lights have been turned on. The controller 200 monitors signals from the Headlamp/Tail Lamp sensor 202 and the trunk lid sensor 204. When the lighting device $L_4$ is illuminated, and the trunk lid sensor 204 provides a signal indicating that the movable body panel 18 is in the closed position, the controller 200 enables operation of the lighting device $L_4$. However, if the trunk lid sensor 204 provides a signal indicating that the movable body panel 18 is no longer in the closed position, the controller 200 ceases operation of the lighting device $L_4$.

SECOND EMBODIMENT

Figure 14:
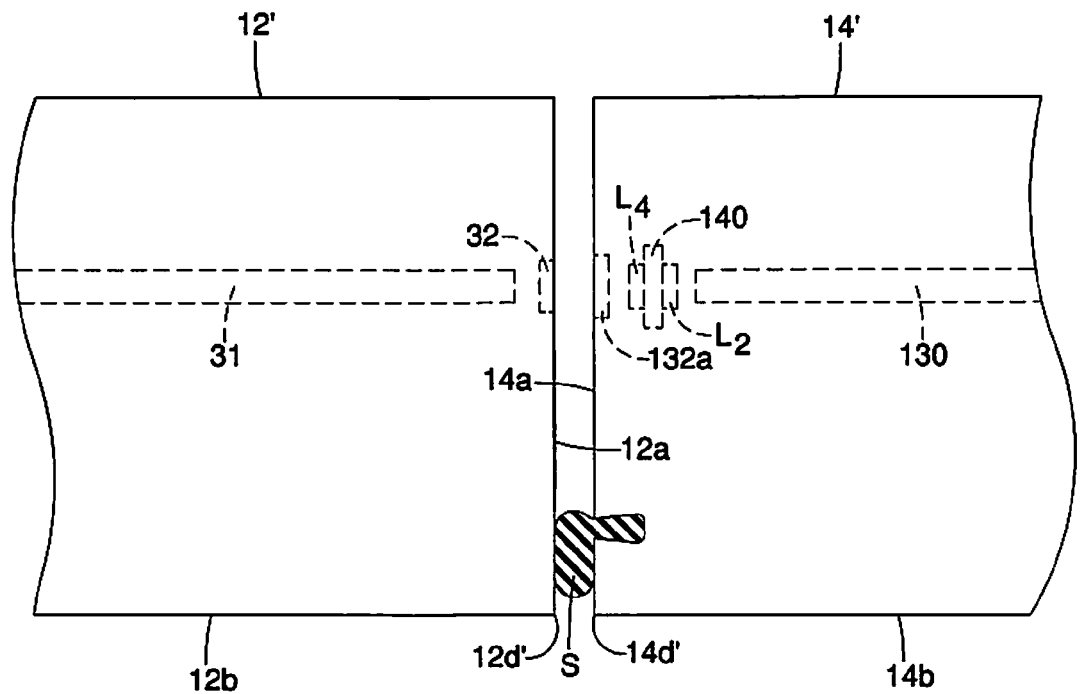
FIG. 14 is a cross-sectional top view of a first lamp assembly and a second lamp assembly in accordance with a second embodiment.

Referring now to FIG. 14, a first lamp assembly 12' and a second lamp assembly 14' in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. The parts of the second embodiment that differ from the parts of the first embodiment will be indicated with a single prime (').

In the second embodiment, the first lamp assembly 12' includes all of the features of the first lamp assembly 12 of the first embodiment, except that a rear corner 12d' of the first lamp assembly 12' does not include the curved contour. The second lamp assembly 14' includes all of the features of the first lamp assembly 14 of the first embodiment except that a rear corner 14d' of the second lamp assembly 14' does not include a projection.

In the second embodiment, the second lamp assembly 14' is provided with an elastic seal member S. The seal S at least partially blocks light emitted by the lighting device L4 that might leak into the gap G between the first lamp assembly 12' and the second lamp assembly 14'.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment, the following directional terms "forward", "rearward", "above", "downward", "vertical", "horizontal", "below" and "transverse" as well as any other similar directional terms refer to those directions of a vehicle equipped with the vehicle lighting structure. Accordingly, these terms, as utilized to describe the present invention should be interpreted relative to a vehicle equipped with the vehicle lighting structure.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature. Thus, the foregoing descriptions of the embodiments according to the present invention are provided for illustration only, and not for the purpose of limiting the invention as defined by the appended claims and their equivalents.

What is claimed is:

1. A vehicle lighting structure comprising:
   a vehicle body structure having an outer body surface surrounding an opening;
   a closure member pivotally supported to the vehicle body structure and movable between a closed orientation covering the opening and an open orientation exposing the opening;
   a first lamp assembly having an attachment surface attached to the vehicle body structure adjacent to the opening, a transparent surface opposite the attachment surface, and a side surface extending from the light emitting surface to the attachment surface, the side surface having a first light passage, the first lamp assembly having a hollow interior that includes a light dispersing member disposed within the hollow interior, the light dispersing member being positioned to receive light emitted through the first light passage; and
   a second lamp assembly having an attachment surface attached to the closure member, a transparent surface opposite the attachment surface and a side surface extending from the transparent surface to the attachment surface, the side surface having a second light passage, the second lamp assembly having a hollow interior with a first lighting device disposed therein, the first lighting device being positioned to emit light through the second light passage, such that with the closure member in the closed orientation, the second light passage and the first light passage are adjacent to one another and with the first lighting device operating, the first lighting device emits light through the second light passage into the first light passage illuminating the light dispersing member within the first lamp assembly.

2. The vehicle lighting structure according to claim 1, wherein
the second lamp assembly includes a second lighting device and a second light dispersing member positioned to receive light emitted by the second lighting device, the second light dispersing member further being positioned to emit light to the second transparent surface.

3. The vehicle lighting structure according to claim 2, wherein
the second lamp assembly includes a circuit board with the first lighting device being fixed to a first surface of the circuit board and the second lighting device being fixed to a second surface of the circuit board opposite the first surface.

4. The vehicle lighting structure according to claim 3, wherein the first lighting device and the second lighting device are LEDs.

5. The vehicle lighting structure according to claim 1, wherein
one of the first lamp assembly and the second lamp assembly includes a projection that protrudes from an edge of a corresponding one of the first side surface and the second side surface such that when the second light passage and the first light passage are adjacent to one another with the first and second light passages being aligned the projection at least partially blocks light leakage from the second light passage.

6. The vehicle lighting structure according to claim 5, wherein
the projection is an elastic seal member attached to the one of the first lamp assembly and the second lamp assembly.

7. The vehicle lighting structure according to claim 1, wherein
the first light passage includes an optical lens configured to focus light received from the second light passage to an adjacent end of the first light dispersing member.

8. The vehicle lighting structure according to claim 7, wherein
the second light passage includes an optical lens configured to focus light received from the first lighting device at the second light passage.

9. The vehicle lighting structure according to claim 1, wherein
the first lamp assembly defines a first upper edge and the second lamp assembly defines a second upper edge that is aligned with the first upper edge with the closure member in the closed orientation.

10. The vehicle lighting structure according to claim 1, further comprising:
a closure member sensor within the vehicle body structure that detects orientation of the closure member; and
a controller connected to the closure member sensor and the first lighting device, the controller being configured to operate the first lighting device in response to determining that the closure member is in the closed orientation and cease operating the first lighting device in response to determining that the closure member is in the open orientation.

* * * * *